(12) United States Patent
Ranzoni et al.

(10) Patent No.: US 6,685,048 B1
(45) Date of Patent: Feb. 3, 2004

(54) KITCHEN UTENSIL

(75) Inventors: Francesco Ranzoni, Brescia (IT); Giulio Iacchetti, Cremona (IT)

(73) Assignee: Bialetti Industrie S.p.A., Verbania (IT)

( * ) Notice: Subject to any disclaimer, the term of this patent is extended or adjusted under 35 U.S.C. 154(b) by 0 days.

(21) Appl. No.: 09/463,396
(22) PCT Filed: Jul. 15, 1998
(86) PCT No.: PCT/EP98/04400
§ 371 (c)(1),
(2), (4) Date: Aug. 17, 2000
(87) PCT Pub. No.: WO99/05948
PCT Pub. Date: Feb. 11, 1999

(30) Foreign Application Priority Data

Aug. 1, 1997 (IT) .......................................... MI97A1857

(51) Int. Cl.[7] .................................................. B65D 1/26
(52) U.S. Cl. ...................................................... 220/759
(58) Field of Search ......................................... 220/759

(56) References Cited

U.S. PATENT DOCUMENTS

| 3,813,003 A | 5/1974 | Bernazzani | 220/94 |
| 4,185,748 A | 1/1980 | Vache et al. | 220/8 |
| 4,331,251 A | 5/1982 | Berman et al. | 220/4 |
| 6,186,395 B1 * | 2/2001 | Kennett | 220/757 |

FOREIGN PATENT DOCUMENTS

| DE | 196 21 524 | 7/1997 |
| EP | 0 247 229 | 10/1986 |

* cited by examiner

Primary Examiner—Joseph Man-Fu Moy
(74) Attorney, Agent, or Firm—Rothwell, Figg, Ernst & Manbeck, P.C.

(57) ABSTRACT

A kitchen utensil (400) has a receptacle (405) and at least one handle (420) connected to the receptacle (405), a predominant portion of the handle (420) being divided along a substantially longitudinal direction (A) into a first portion (425) and a second portion (430) which fit together at least partially along the longitudinal direction (A) and each of which is articulated to the receptacle (405) for pivoting between a rest position in which it is disposed with a free end in the vicinity of the receptacle (405) thus reducing the bulk of the utensil, and a working position in which the first portion and the second portion (425, 430) are joined together so that the handle (420) forms a substantially unitary element firmly fixed to the receptacle (405) for firm gripping of the utensil.

20 Claims, 4 Drawing Sheets

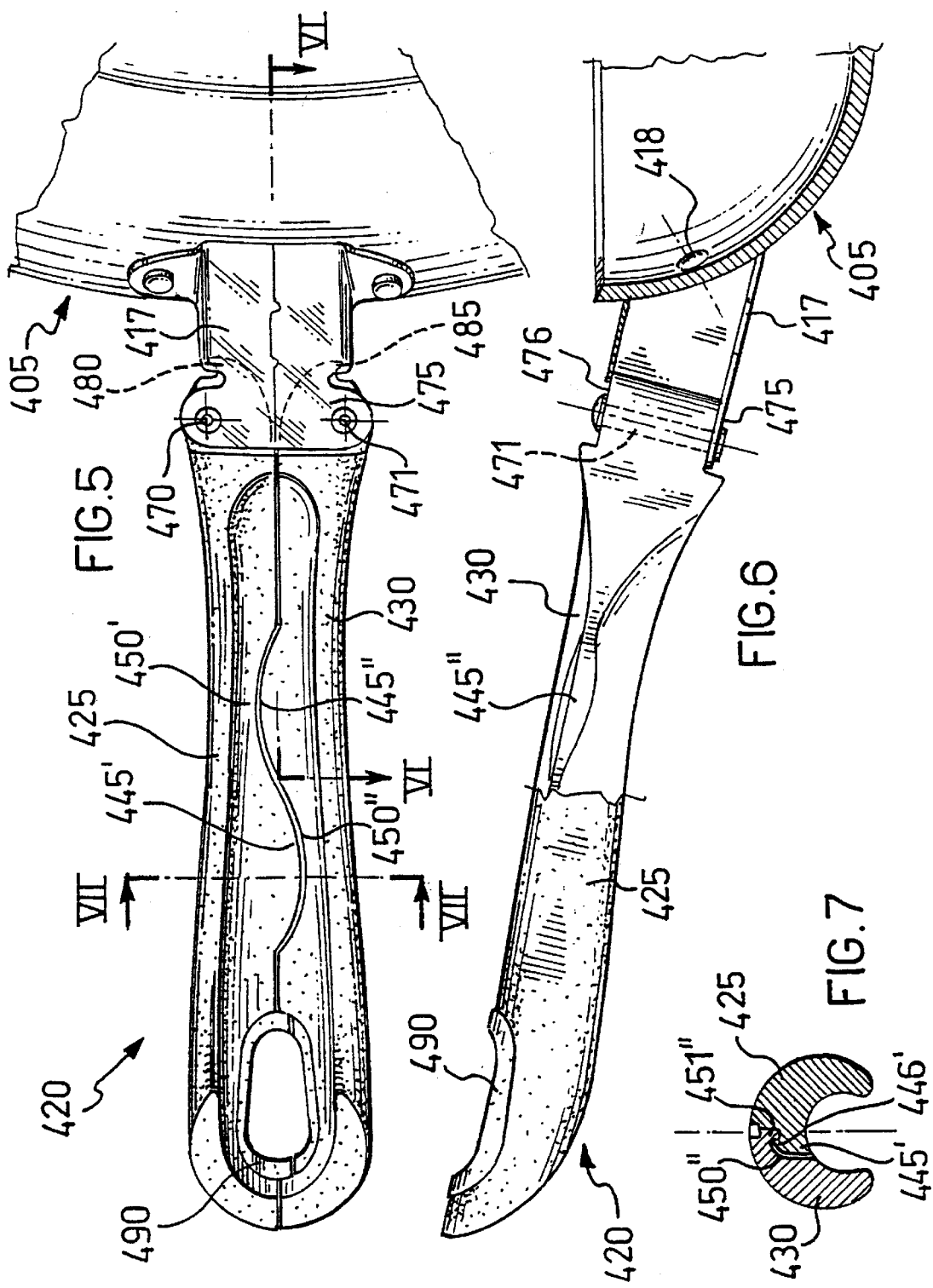

KITCHEN UTENSIL

The present invention relates to a kitchen utensil and, in particular, to a kitchen utensil comprising a receptacle and at least one handle connected to the receptacle.

A kitchen utensil such as, for example, a pan, used for cooking food generally has a long handle extending radially from a receptacle of the pan which holds the food.

A problem with kitchen utensils of this type is that they are extremely bulky. This means that large boxes have to be used for packaging them and it is quite difficult to arrange the pans in a dishwasher; moreover, the handle projecting from the receptacle takes up a considerable amount of space in kitchen cupboards and makes it extremely difficult to arrange the pans in an orderly manner.

A known solution consists of the use of a handle articulated to an upper edge of the receptacle of the pan. When the pan is not in use, the handle is pivoted about a horizontal axis until it is disposed inside the receptacle, thus reducing the space occupied by the pan.

A disadvantage of this known kitchen utensil is that the handle is not connected rigidly to the receptacle; this makes the pan extremely inconvenient and dangerous to use since accidental movements of the receptacle relative to the handle during the cooking of food may cause very hot substances, particularly liquids, to spill from the pan. Moreover, the handle closed inside the pan makes it difficult to stack several utensils vertically, for example in kitchen cupboards.

The object of the present invention is to prevent the aforementioned problems.

From U.S. Pat. No. 3,813,003 a kitchen utensil is known comprising a receptacle and one handle connected to the receptacle and formed by a first member and a second member, each member being articulated to the receptacle for pivoting between a rest position in which it is disposed with a free end in the vicinity of the receptacle and a working position in which the first and second members are joined together.

According to the invention, a kitchen utensil is provided as described with reference to said prior document U.S. Pat. No. 3,813,003, characterised in that said members are constituted by two portions of the handle obtained by dividing correspondingly at least a predominant part thereof, wherein in said working position said portions of the handle fit together at least partially and form a substantially unitary element firmly fixed to the receptacle and extending along a substantially longitudinal direction.

Figure 1:
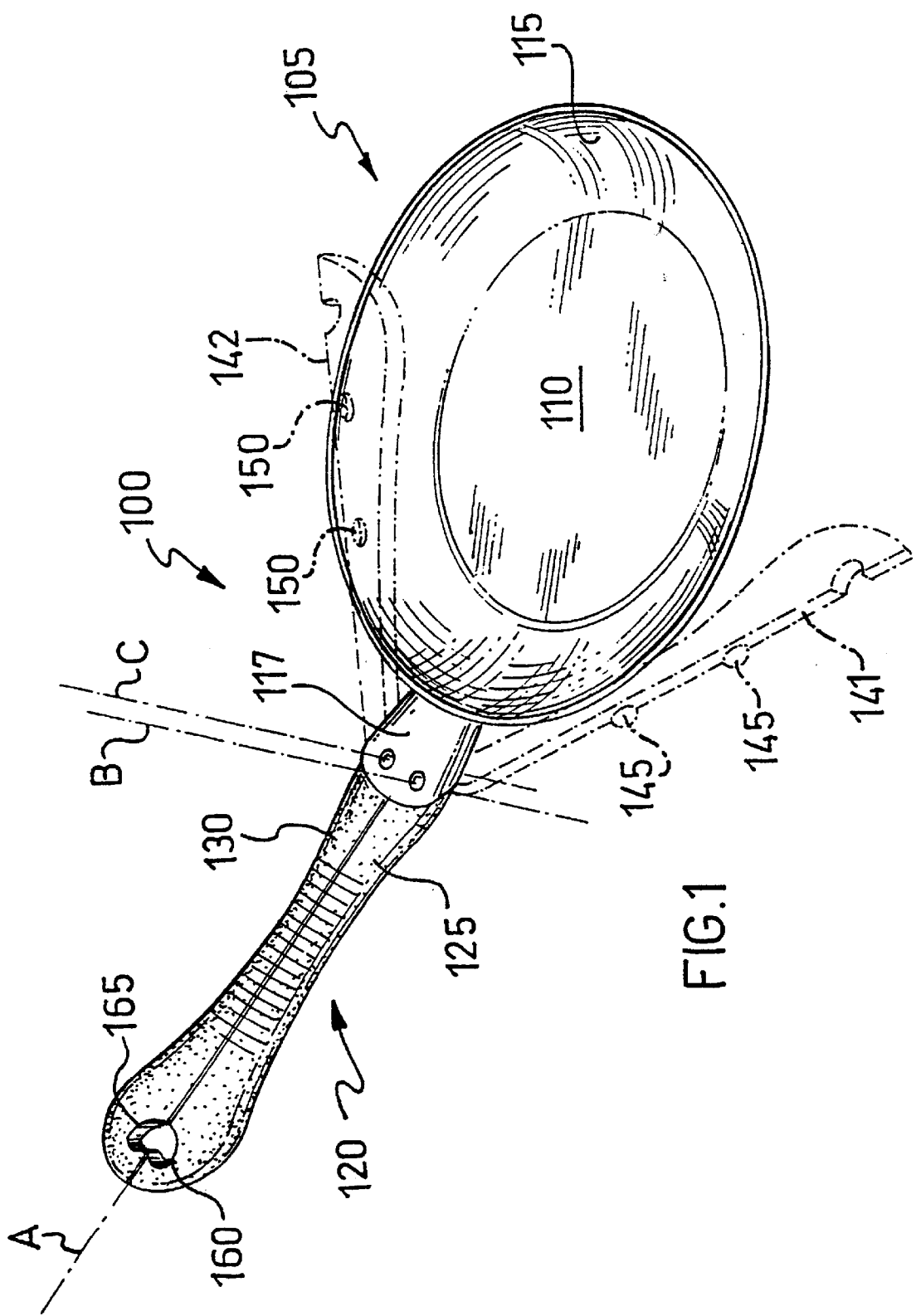
Figure 3:
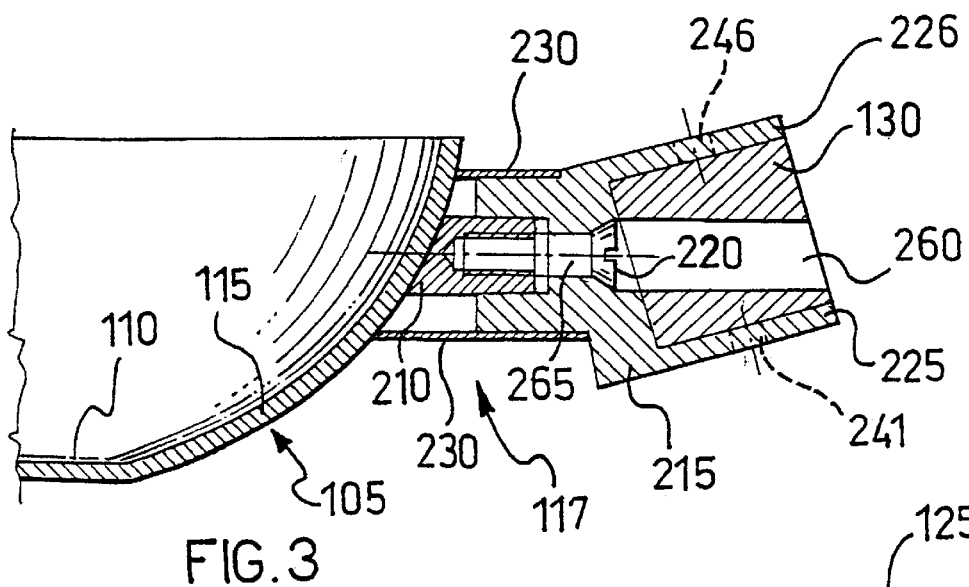
Figure 2:
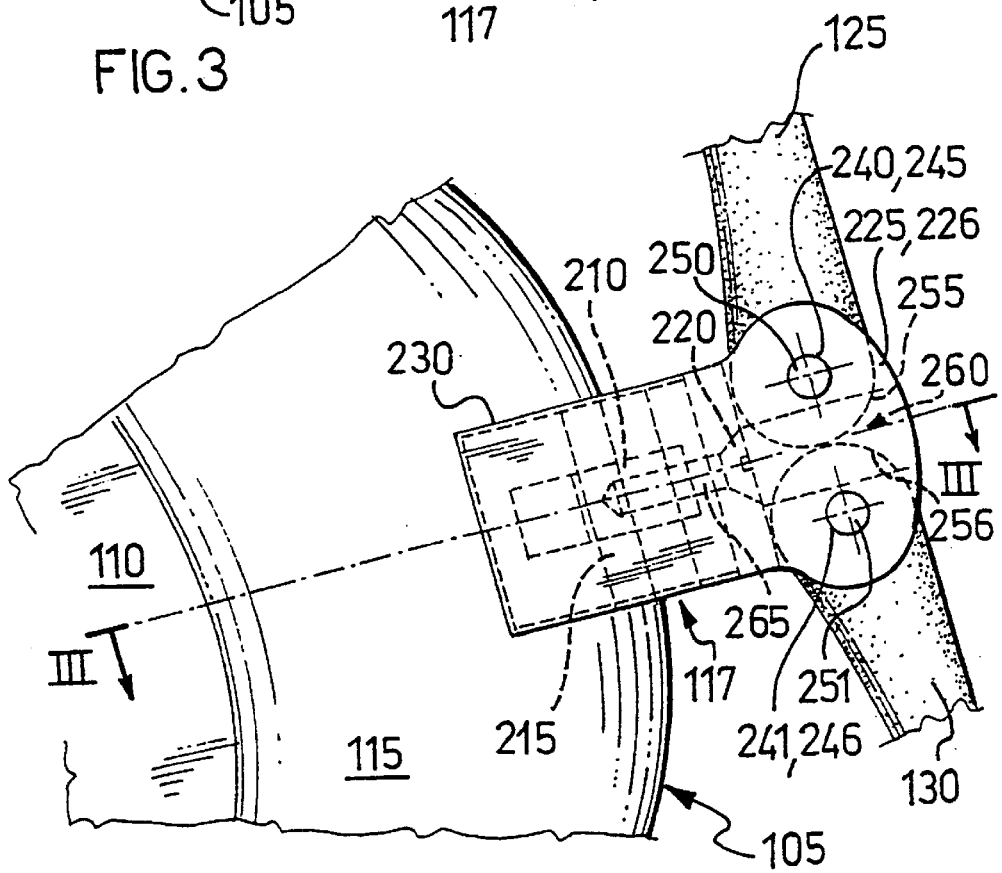
Figure 4:
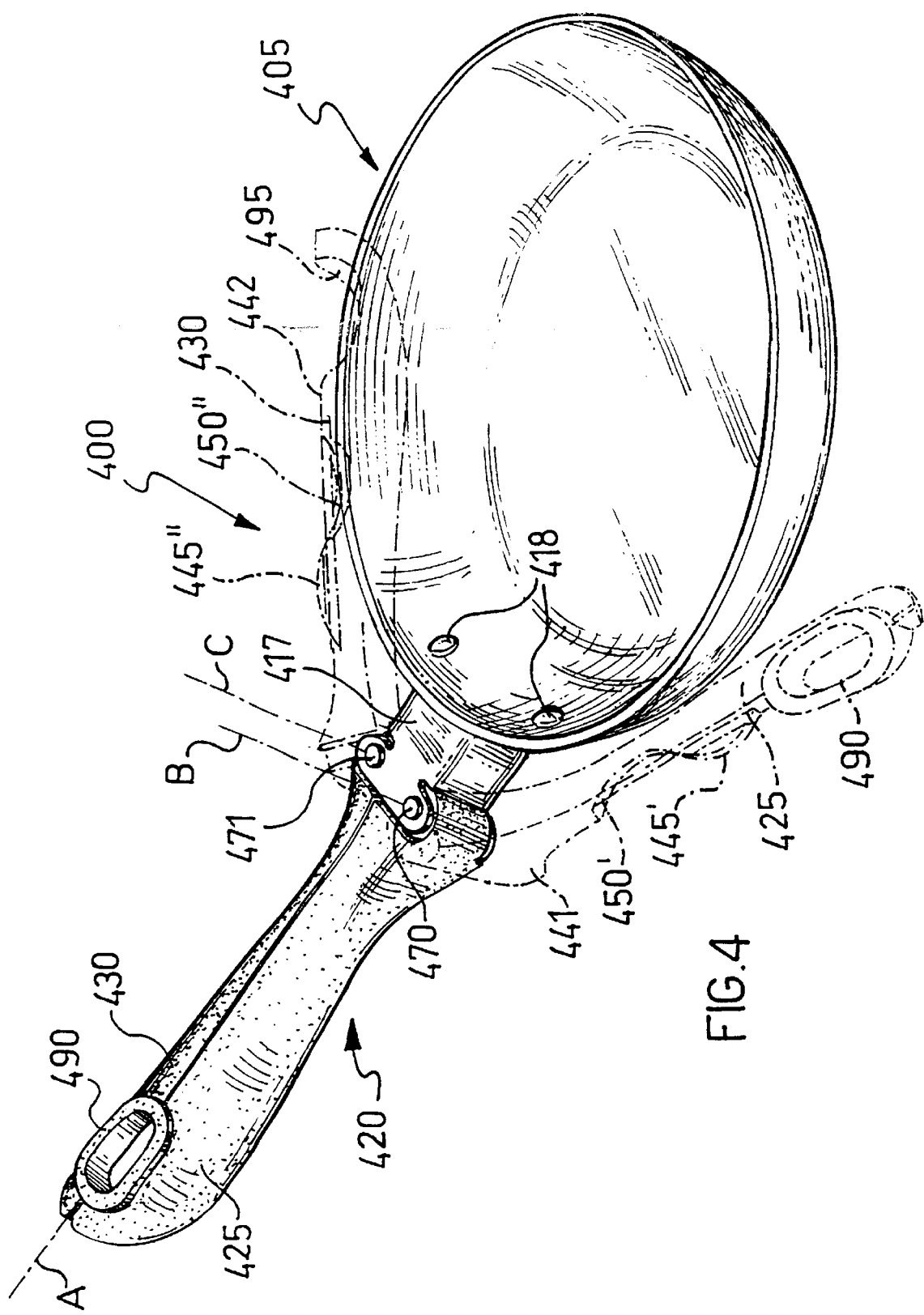

For a better understanding, two embodiments of the present invention are described below, by way of non-limiting example, with reference to the appended drawings, in which:

FIG. 1 is a perspective view of a kitchen utensil according to the present invention, FIG. 2 is a view from below of an embodiment of the connection of the handle to the receptacle of the kitchen utensil of FIG. 1, FIG. 3 is a side view of the connection of FIG. 2, sectioned on the line III—III, FIG. 4 shows in perspective a kitchen utensil of the same type as that of the previous drawings, with differences in the handle and in the connection of the handle to the container body, FIG. 5 shows the handle of the container of FIG. 4 from below, FIG. 6 is a side view of the handle of FIG. 5, partially sectioned on the line VI—VI, FIG. 7 is a transverse section of the handle of FIG. 5, taken on the line VII—VII.

With reference in particular to FIG. 1, this shows a pan 100 having a receptacle 105 used for holding food during cooking. The receptacle 105 (which, typically, is made of aluminium, steel or another material suitable for fire or heat) is constituted by a flat base 110 and by a side wall 115, and is of a slightly flared, circular shape. A block 117 fixed to the receptacle 105 extends radially outwards enabling a handle 120 used for the gripping and handling of the pan 100 to be connected to the receptacle 105. Typically, the handle 120 extends radially from the receptacle 105 and is parallel or slightly inclined (for example at 15°) to the base 110.

The handle 120 is divided longitudinally into two portions or half-handles 125 and 130 fitting together along a plane perpendicular to the base 110 and extending through a longitudinal axis A of the handle 120. Each half-handle 125, 130 is articulated to the receptacle 105 in the vicinity of a free end of the fixing block 117 so as to be pivotable relative to the receptacle 105 about an axis indicated B for the half-handle 125 and C for the half-handle 130; the pivot axes B and C are preferably perpendicular or slightly inclined (but not parallel) to the base 110. Alternatively, the handle may include an inner portion fixed to the fixing block, whereas a substantial outer portion of the handle may be divided into two portions articulated to the inner portion of the handle.

Each of the half-handles 125, 130 is movable between a working position (shown in continuous outline) and a rest position (shown in broken outline). In the working position, the half-handles 125, 130 are joined together, with the inner wall 141 of the half-handle 125 in abutment with the corresponding inner wall 142 of the half-handle 130. The unit formed by the half-handles 125, 130 cannot therefore move relative to the fixing block 117 so that the handle 120 is a substantially unitary element firmly fixed to the receptacle 105. In a preferred embodiment of the present invention, one or more cap-shaped spherical projections 145 (two in the embodiment shown in the drawings) project from the inner wall 141 and mate with corresponding recesses 150 formed in the inner wall 142; alternatively, other equivalent elements are provided for preventing relative translation of the half-handles 125, 130 along the longitudinal axis A.

The pan 100 is thus particularly safe in use since relative movements between the handle 120 and the receptacle 105 are not possible in the working position. Moreover, it should be noted that no mechanism is required for locking the half-handles 125, 130 in the working position since, when the pan 100 is in use, the half-handles 125, 130 are in any case held together by the user's grip. In any case, it is possible to provide, for example, a magnetic pin on one half-handle for engaging a matching seat (with an iron plate disposed in its base) formed in the other half-handle, or other equivalent locking means.

In a rest condition, the half-handle 125 and the half-handle 130 are pivoted anticlockwise and clockwise, respectively, so as to be separated and disposed with their free ends in the vicinity of the receptacle 105. When the pan 100 is not in use, its size is thus considerably reduced so that it occupies a much smaller space in kitchen cupboards and in a dishwasher and it can be housed in packaging of limited dimensions.

The pan 100 described above can be used extremely easily and intuitively. Moreover, the pan can be manufactured easily and inexpensively.

In a preferred embodiment of the present invention, the half-handles 125, 130 abut the side wall 115 externally in the rest position. The half-handles 125, 130 thus occupy no space inside the receptacle 105, enabling several pans to be stacked vertically. Moreover, this enables the half-handles 125, 130 to be brought to the rest position even with the pan 100 in use and containing food, immediately reducing the space occupied by the pan 100, for example, in an oven. In this case, since the half-handles 125, 130 are articulated to the fixing block 117 at points spaced from the side wall 115, they are free to pivot through an angle greater than 90° before abutting the side wall 115; the half-handles are thus inclined to one another by an angle well below 180° in the rest position, so that the space occupied by the pan 100 fits the shape of the kitchen cupboards in an optimal manner, enabling the pans to be arranged in an extremely orderly manner therein. The present invention may, however, also be implemented with half-handles which are disposed within the receptacle, above an upper edge thereof, in the rest position, even with their free ends in contact.

The half-handles 125, 130 advantageously have respective hook-shaped recesses 160 and 165 in the vicinity of their free ends, the recesses forming a through-hole in the handle 120 when the half-handles 125, 130 are joined together; each recess 160, 165 enables the pan 100 to be hung up (for example, on a suitable hook) without risk of coming off. Moreover, the recesses 160, 165 facilitate the separation of the half-handles 125, 130.

FIGS. 2 and 3 (elements already shown in FIG. 1 are identified by the same reference numerals therein) show an embodiment of the fixing block 117. The block 117 includes a nut 210 welded (or fixed with rivets) to the outside of the side wall 115 of the receptacle 105 so that the axis of a threaded hole thereof is parallel to the base 110. An element 215 (for example made of aluminium) for supporting the half-handles 125, 130 is engaged on the nut 210 and has a main solid portion which has a recess fitting the nut 210 and in which a through-hole 220 coaxial with the nut 210 is formed. A tubular connecting element 230 (typically with a rectangular cross section) is fitted between the side wall 115 and a locating step formed on the main portion of the support element 215. Two parallel flanges, that is, a lower flange indicated 225 and another, upper flange indicated 226, extend from the main portion of the support element 215. Two through-holes 240 and 241 are formed in the lower flange 225 and are coaxial with two holes 245 and 246 formed in the upper flange 226. Each pair of corresponding holes 240, 245 and 241, 246 houses a pin, indicated 250 or 251, respectively, which defines a cylindrical hinge for the connection of the corresponding half-handle 125 or 130. Two grooves 255 and 256 are formed in respective half-handles 125 and 130 and, when the half-handles 125, 130 are arranged opposite one another at an angle of 180°, the grooves 255, 256 define an opening 260 for the insertion of a screw 265. The screw 265 is inserted in the hole 220 and is screwed into the nut 210 so as to clamp the support element 215 to the receptacle 105.

The fixing block 117 described above is extremely simple and inexpensive (since it uses standard parts which can be mass produced at low cost) and can be adapted to a receptacle 105 of any shape by means of the tubular element 230. Moreover, it should be noted that, when the half-handles 125, 130 are joined together in the working position, the screw 265 is not visible from the exterior, achieving an excellent aesthetic effect.

FIGS. 4, 5 and 6 show another pan, indicated 400, comprising a receptacle 405 and a handle 420, in which the handle and its attachment to the receptacle differ from those described above.

In particular, the fixing block 417 is constituted by a single hollow body, for example, of aluminium, fixed to the receptacle 405 by means of rivets 418. This fixing block is particularly simple, inexpensive and adaptable to receptacles of any shape.

With regard to the handle 420, the two half-handles 425 and 430 are articulated to the block 417 in the manner described in the preceding embodiment, that is, by means of two pins 470 and 471 fixed between a lower flange 475 and an upper flange 476 of the block 417, respectively. It should be added that the two half-handles 425 and 430 have, in the region of the articulation, two respective stop ends 480, 485 each of which abuts an inner wall of the block 417 when the respective half-handle is in the working position.

However, the configuration of these half-handles 425 and 430 differs from the previous embodiment.

In particular, a projection 445' shaped like an arc of a circle is formed in the inner wall 441 of the half-handle 425 adjacent a similarly arc-shaped recess 450'; similarly, a recess 450" and a projection 445" both shaped like arcs of circles, are formed adjacent one another in the inner wall 442 of the half-handle 430 and are coupled with the projection 445' and with the recess 450' of the other half-handle 425, respectively. As shown in FIG. 7, the projection 445' of the half-handle 425 is coupled with the recess 450" of the other half-handle 430 by snap-engagement, by means of suitable interfering portions 446' and 451" of the projection 445' and of the recess 450", respectively; the projection 445" and the recess 450' are also coupled with snap-engagement by means of interfering portions identical to the previous ones. Engagement is permitted by small amounts of play between the two half-handles. The size of the projecting portions is such that they are released by a minimal effort to open out the half-handles.

The coupling of the two half-handles 425, 430 is very firm.

In the half-handle 425 there is a eyelet-like portion 490 half of which projects from the inner wall 441 of the half-handle and is housed in a recess 495 of the other half-handle 430. This eyelet-like portion 490 can be used to hang the pan on a suitable hook.

Clearly further variants and/or additions to the embodiments described and illustrated are possible.

Snap-engagement means between the two half-handles may also be provided in the pan 100, as in the pan 400. The snap-engagement means may be of any type and may even be resilient.

In general, further configurations of the fixing block and of the two half-handles falling within the scope of the present invention may be provided in addition to those already described.

The handle may be divided into symmetrical or non-symmetrical portions and these portions may be divided in a plane parallel to the base of the container and articulated at different points to prevent pivoting of the handle when they are joined together, etc.

The invention described above is applicable, with clear modifications, to utensils of any type, for example, to a saucepan, a pot, a frying pan, a grill pan, etc. The utensil may also be of any shape.

What is claimed is:

1. A kitchen utensil comprising a receptacle and at least one handle connected to the receptacle, wherein the handle is divided along a longitudinal axis of the handle into at least a first portion and a second portion, each of the first and second handle portions being articulated to the receptacle to pivot in a plane which is coplanar relative to the longitudinal axis of the handle between a rest position in which each of the first and second handle portions is disposed with a free end in a vicinity of the receptacle and a working position in which each of the first and second handle portions matingly engage each other in a continuous manner along the longitudinal axis of the handle to form a unitary element that is firmly fixed to the receptacle.

2. A kitchen utensil according to claim 1, wherein the handle portions are joined together by snap-engagement.

3. A kitchen utensil according to claim 1 wherein each of the first and second handle portions is pivotable about an axis that is not parallel to a base of the receptacle.

4. A kitchen utensil according to claim 3, wherein the first and second handle portions are divided from one another in a plane perpendicular to the base of the receptacle and extending through the longitudinal axis of the handle, wherein the first and second portions abut one another in the working position.

5. A kitchen utensil according to claim 4, further comprising means for preventing relative translation of the first and second handle portions along the longitudinal axis of the handle in the working position.

6. A kitchen utensil according to claim 1, wherein the first and second handle portions abut a side wall of the receptacle in the rest position.

7. A kitchen utensil according to claim 1, wherein each of the first and second handle portions include, in the vicinity of the free end thereof, a hook-shaped recess to hang the kitchen utensil.

8. A kitchen utensil according to claim 1, further comprising a fixing block fixed to the receptacle and extending radially outwards, the first and second handle portions being articulated to the receptacle in a vicinity of a free end of the fixing block.

9. A kitchen utensil (100) according to claim 8, wherein the fixing block (117) includes a nut (210) fixed to the side wall (115) of the receptacle (105), a support element (215) engaged on the nut (210) in order to support the first and second portions (125, 130) and having a through-hole (220) coaxial with the nut (210), and a screw (265) inserted in the through-hole (220) and screwed into the nut (210) in order to clamp the support element (215) to the receptacle (105).

10. A kitchen utensil (100) according to claim 9, further comprising a tubular connecting element (230) fitted between the side wall (115) of the receptacle (105) and the support element (215).

11. A kitchen utensil (100) according to claim 9, wherein the first and second handle portions (125, 130) include a first groove (255) and a second groove (256), respectively, defining an opening (260) for the insertion of the screw (265) when the first and second handle portions (125, 130) are disposed opposite one another.

12. A kitchen utensil (100) according to claim 9, wherein the support element (215) includes a first flange (225) in which a first hole (240) and a second hole (241) are formed, and a second flange (226) which is parallel to the first flange (225) and in which a third hole (245) and a fourth hole (246) coaxial with the first hole (240) and with the second hole (241), respectively, are formed, the first and third holes (240, 245) housing a first pin (250) for connecting the first handle portion (125) and the second and fourth holes (241, 246) housing a second pin (251) for connecting the second handle portion (130).

13. A kitchen utensil according to claim 8, wherein the fixing block comprises a single hollow body fixed to the receptacle by at least one rivet.

14. A kitchen utensil according to claim 8, wherein each of the first and second handle portions comprise stop means which abut an inner wall of the fixing block when the handle is in the working position.

15. A kitchen utensil according to claim 5, wherein the means for preventing relative translation of the two handle portions comprise at least one projection formed in an inner wall of one of the first and second handle portions and is coupled with a corresponding recess formed in an inner wall of the other of the first and second handle portions.

16. A kitchen utensil (100) according to claim 15, wherein the projection (145) and the recess (150) are shaped like spherical caps.

17. A kitchen utensil according to claim 15, wherein the projection and the recess are arc shaped.

18. A kitchen utensil according to claim 15, wherein the projection and the recess have interfering portions coupled by snap-engagement.

19. A kitchen utensil according to claim 1, wherein one of the first and second handle portions include, in the vicinity of the free end, a projection housed in a corresponding recess in the other handle portion and in which a hole is formed to hang the utensil.

20. A kitchen utensil according to claim 1, wherein the free end of the first and second handle portions is remote from the receptacle when the first and second handles are in the working position.

* * * * *